United States Patent

Schmidt

[15] 3,644,678

[45] Feb. 22, 1972

[54] CHANNEL REALLOCATION SYSTEM AND METHOD

[72] Inventor: William G. Schmidt, Rockville, Md.

[73] Assignee: Communications Satellite Corporation

[22] Filed: Mar. 21, 1969

[21] Appl. No.: 809,340

[52] U.S. Cl. ....................................................179/15 BA

[51] Int. Cl. ....................................................H04j 3/00

[58] Field of Search...........179/15 AQ, 15 BA, 15 BZ, 15 AS

[56] References Cited

UNITED STATES PATENTS

| | | | |
|---|---|---|---|
| 3,306,979 | 2/1967 | Ingram | 179/15 BA |
| 3,319,008 | 5/1967 | Kneisel | 179/18.9 |
| 3,340,363 | 9/1967 | Bour | 179/15 BA |

*Primary Examiner*—Kathleen H. Claffy

*Assistant Examiner*—William A. Halvestein

*Attorney*—Sughrue, Rothwell, Mion, Zinn and Macpeak

[57] ABSTRACT

In a time division multiple access communications system having multiple ground stations and a satellite for communicating signals between ground stations, the channels are periodically reallocated among the several ground stations based upon the traffic load at the time of reallocation. At the reallocation time, a slack group of channels, representing presently available channels, are distributed among the ground stations. The time of the periodic transmission (hereinafter referred to as transmission burst) from each ground station is shifted in time with respect to the time of the transmission burst from a reference station to accommodate the reallocation of channels. The transmission burst times of all stations are not shifted simultaneously but are shifted in accordance with a set of rules which prevents overlapping between transmission bursts from adjacent stations.

5 Claims, 12 Drawing Figures

INVENTOR
WILLIAM G. SCHMIDT

BY
Sughrue, Rothwell, Mion, Zinn & Macpeak
ATTORNEY

CHANNEL REALLOCATION SYSTEM AND METHOD

BACKGROUND OF THE INVENTION

In a satellite relay communication system involving multiple end points (ground stations) maximum adaptability would be achieved if all ground stations could communicate with all other ground stations all of the time. Since each communication Communications between any two ground stations occupies two satellite channels which are thereby excluded use by all other ground stations, it can be seen that as the number of ground stations increases the ability to provide circuits between all ground stations becomes more difficult. In the frequency division multiple access (FDMA) mode of communication a channel is represented by a frequency slot within the total satellite bandwidth; in the time division multiple access (TDMA) mode of communication a channel is represented by a time slot within the satellite frame time. A comparison of these two systems is given in a textbook: D. J. Magill, "Multiple-Access Modulation Techniques," *Communication Satellite Systems Technology*, Academic Press, 1966, pp. 667–680.

One of the difficulties of FDMA systems is that the satellite requires a linear system in order to prevent interference, e.g., intermodulation components in the signals transmitted from the satellite. Perfectly linear systems are unattainable, but even to achieve substantially linear systems one gives up 2 to 4 db. in satellite power resulting in a loss of efficiency in satellite utilization. A further problem of FDMA systems is that since all signals do not arrive at the satellite with substantially the same power level, a stronger signal will capture the satellite power causing a loss in power of the weaker signals.

Since, in general, only one signal from one ground station occupies a satellite transponder at any given instant of time in a TDMA system, the above-mentioned problems of intermodulation and power seizure are not present. However, TDMA does present the problem of insuring time separation between the signals from the various ground stations as they arrive at the satellite. One such system for insuring the proper time separation between the station bursts (a station's transmission time slot) is disclosed in copending U.S. Pat. application of Gabbard, entitled Synchronization for TDMA Satellite Communication System Ser. No.594,921, filed Nov. 16, 1966 and assigned to the assignee of the present invention. designated ground stations. The assignments were made on the basis of expected traffic at the particular ground stations. Aside from the difficulty in providing full-time circuits between all ground stations in a system comprising a large number of ground stations (the "linkage" problem), the major drawback of a preassigned channel allocation scheme is inefficiency. For example, if a channel is preassigned to a ground station which has an expected traffic load of only 150 call minutes per day, then that channel will be idle for almost 22 hours per day.

A solution to the problems mentioned above is to have the ground stations share a pool of satellite channels which are not preassigned. Each of the channels can then be assigned on demand, forming a temporary link between any two earth stations equipped to have access to the channels in the pool. At the end of a communication via said link, the channel utilized is then returned to the pool wherein it can be picked up on demand by other ground stations.

A method of accomplishing the demand assignment of satellite channels in the FDMA mode is disclosed in the U.S. Pat. application of Puente et al. entitled Local Routing Channel Sharing System and Method for Communications via a Satellite Relay, Ser. No. 719,138 filed Apr. 5, 1968, and assigned to the assignee of the present invention. As disclosed in the above-mentioned patent application there are a multiplicity of carriers in a pool, each carrier representing a satellite channel. When a ground station desires an additional channel, it makes a request which is conveyed to all other ground stations. The requesting station then seizes the first available channel and uses it for its transmission of communications to another ground station. All ground stations periodically transmit information, received by all other ground stations, of the channels it is presently using. Thus, each ground station always knows which of the pool channels are in use and which are available for seizing.

SUMMARY OF THE INVENTION

In accordance with the present invention, which is applicable to a TDMA communications system, the channels are not fixed according to some preassignment scheme but are periodically reallocated on a demand basis. At suitably selected periods, a reference station transmits to all ground stations in the network a freeze signal which has a twofold purpose. First, each ground station immediately thereafter indicates the number of its highest numbered active channel (described in detail below), transmitting it to all other stations, and, second, no ground station activates a channel of higher number than that identified as the highest numbered active channel until such time as the channel reallocation procedure is completed. The number sent out by a ground station in response to the freeze signal is generally referred to as the station (RQT). (TQT). In the specific example described herein the station request (RQT) sent out is the stations present channel requirement (PCR) which is related to the number of channels presently used by the station and will be defined more particularly below. Thus, at each ground station the total present channel requirement for the entire system can be computed by adding the information received from all ground stations. Since the total number of channels in a system is also known, the "slack" or total surplus available channels can be easily computed. The surplus channels can then be allocated among the several ground stations in accordance with any desired formula, a preferred one being to divide the total number of surplus channels by the number of ground stations and allocating the integral quotient to each of the ground stations. In this manner, the surplus available channels will be allocated equally among the stations.

The present channel requirement (PCR) of a given station and the number of surplus channels to be allocated to that station represent the total number of channels to be assigned to the given station. This latter sum is subtracted from the currently assigned number of channels to provide a difference number which represents the difference between the currently assigned number of channels and the number of channels to be reassigned to this station. The numbers mentioned thus far, for each station, are computed and held at every station. The difference numbers are useful in determining the order in which the station transmission bursts are to be shifted, as will be explained hereinafter.

DETAILED DESCRIPTION OF THE DRAWINGS

In general a TDMA satellite communications system a single carrier occupies the entire bandwidth of a satellite transponder at any one time. Communication between any two ground stations is prevented from interfering with communication between two other ground stations by providing separate times for the respective communications. The time separations of interest are the time separations of the signals to and from the various stations as they appear at the satellite transponder, i.e., it is not critical that the transmission of signals from two stations not overlap at the time of transmission, so long as the transmitted signals do not overlap when they are received at and transponded by the satellite. Thus all times are referenced to the time of occurrence of the signals at the satellite. For example, periodically at a reference time, referred to as the frame reference, station A turns on its transmitter carrier and transmits communications via the satellite to the other stations. This time, during which station A is transmitting, is known as the burst time or simply as the station burst for station A. The burst time is divided up into many channels, each channel representing a single conversation emanating from station A. In a preassignment-type system, the total number of channels in the burst is fixed and the destination of each channel is preassigned. Thus, the first group of channels in the station A burst may be designated for communication with station B, the second group of channels within a station burst may be designated for communication with station C, etc. The station B transmitter is turned on to initiate the station B burst at a time so that the station B burst appears at the satellite just after the termination of the burst from station A. This is followed by a station C burst, station D burst, etc. The station bursts are timed so that as viewed at the satellite the last station burst ends prior to the frame reference time at which the station A burst again appears. The period between initiation of successive bursts from the reference station is known as the frame time for the TDMA communications system. The bursts from the various stations are prevented from overlapping when they arrive at the satellite by a burst synchronization system controlling the respective transmit times such as that shown in the above-mentioned application to Gabbard.

Figure 1:
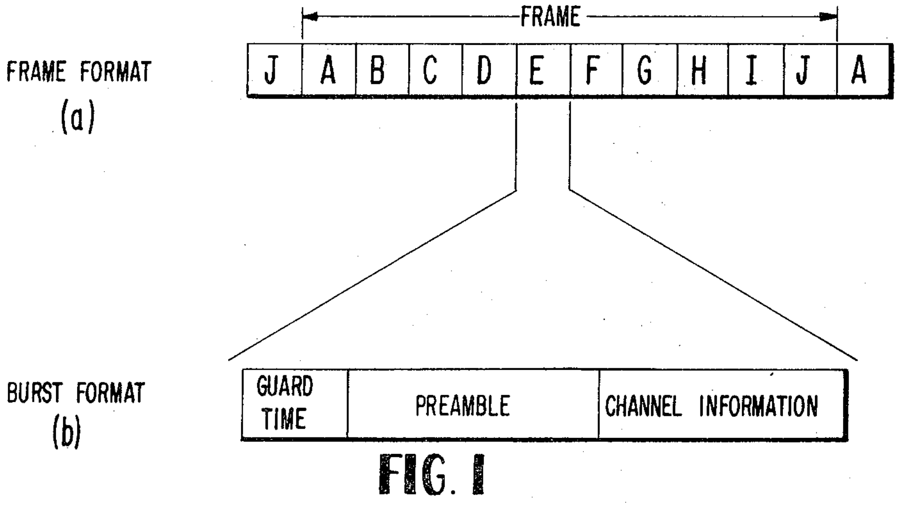
FIG. 1*a* illustrates the frame format for a 10-station TDMA communications system and FIG. 1*b* illustrates the burst format for the transmission burst of any single station.

In the drawings, FIG. 1*a* shows the frame format for a 10-station TDMA communications system. A typical burst format known in the prior art is illustrated in FIG. 1*b*. The three illustrated portions of the typical prior art burst format shown in FIG. 1*b* are guard time, preamble, and channel information. The guard time is a transmission-free period which serves the purpose of preventing adjacent bursts in the frame from overlapping at the satellite. It will be noted that the more accurate the burst synchronization system used the smaller the amount of time necessary for guard time. The preamble typically includes carrier recovery and bit timing recovery information which is used to synchronize the receiver in the ground stations which receive the burst. The preamble also includes a unique word which identifies the sending station and an address word which identifies the addressee stations. Additional information, such as present channel requirement of the sending station may be placed in the preamble. The significance of the latter information will be explained more fully below. The channel information portion contains the messages sent between stations, such as digitized and encoded voice transmission. This portion is divided up into smaller time slots (channels) each carrying information destined for one of the addressee stations. Each station receives all channel information but extracts only the information in those channels which is addressed to it.

Figure 2:
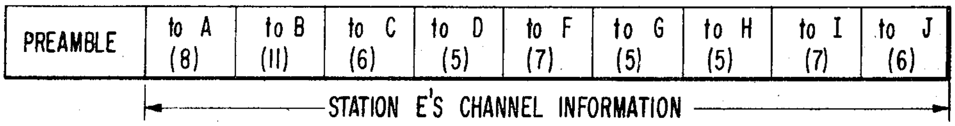
FIG. 2 illustrates the format of a station burst in which the channels are preassigned.

As an example of the manner of distributing channels in accordance with a preassignment channel allocation scheme, assume a TDMA system having a capacity of 600 channels and 10 stations. Thus, there are 10×9=90 possible one way links in the network and each station must divide its allotted channels into nine separate segments if the network is operating on a preassigned basis. Hence, if each station has 60 channels, they may be dedicated in time slots within a burst as shown in FIG. 2. Note that for example, the first eight channels are designated to go to station A, the next 11 channels are designated to go to station B, etc. It is assumed that the format shown in FIG. 2 represents the burst from station E. An extreme example of the problem associated with formating the burst in this manner is illustrated by assuming that the only traffic currently emanating from station E is that which is directed to station J. If that is the case, then information will be transmitted only during the last six channels. Such a scheme is extremely wasteful of satellite power and in addition is not flexible enough to accommodate efficiently a network in which there is a significant time differential in peaking of each station's traffic.

If we consider the case of a network with a 600-channel capacity and 60 stations in the network, there are 3,540 possible one-way links. Preassigned channels, in this instance, do not make sense since there exists only about one satellite channel for each six possible one-way links, thus precluding certain links. Thus, in a preassigned system links which are used only infrequently cannot be accommodated at all.

In accordance with the present invention, the channels are reallocated periodically among the stations on a demand basis. It is assumed for the purpose of this example that the available channels within a station burst time are seized in the order of lowest numbered idle channel first. In its simplest form, this can be accomplished manually by the operator's selecting the lowest numbered idle channel upon receipt of a request from a subscriber for a channel. For example, the first subscriber will get the first channel, which is the channel nearest in time to the beginning of the station burst. The second subscriber will get the second channel, etc. Assuming that the first six channels are occupied and that the subscriber using channel 3 terminates his call, channel 3 now becomes idle. Upon receipt of the next request for a channel, the operator will select channel 3 rather than channel 7 because channel 3 is the lowest numbered idle channel at this time. As used herein, the highest numbered active channel at any given station represents the "-present channel requirements" for that station even though some of the intermediately numbered channels may be momentarily idle.

Figure 3:
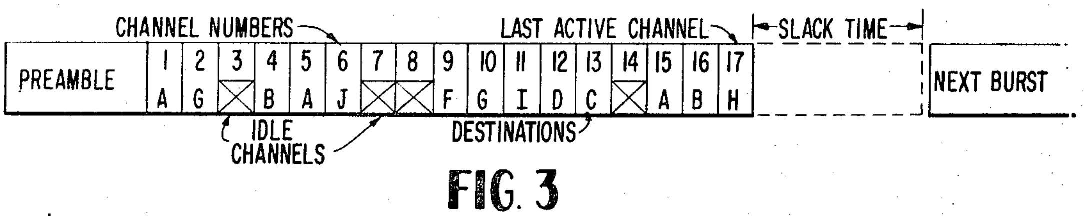
FIG 3 illustrates the format of a station burst in which the channels are demand assigned.

FIG. 3 illustrates the format of a burst from a single station in which the 17th channel is the highest numbered active channel. It will be noted that the station has a total channel allocation of more than 17 channels, but 17 channels, due to the present traffic, represents the "present channel requirement" for the particular station. The number of channels available above the 17th channel comprise what will be hereinafter referred to as the slack time or slack channels for the particular station. It will be noted that even though channels 3, 7, 8, and 14, are presently idle the number 17 is still referred to as the "present channel requirement."

In accordance with the present invention, the times not being critical, a reference station sends out a freeze signal. Upon receipt of the freeze signal each station transmits to all stations in the network a number representing its present channel requirement. Thus, the station illustrated by the burst format of FIG. 3 would send out the number 17. Also, between the time that the freeze signal is received and the time that channel reallocation is completed, no channels in the slack time will be seized. Again referring to FIG 3, this means that if channels 3, 7, 8 and 14 become active and none of the other 17 channels become idle, the station represented by the burst is completely busy and cannot accept any more calls or requests for calls until the end of reallocation. It should be noted that the freeze signal, transmitted by the reference station, serves the purpose of initiating reallocation of the channels among the stations which share in the pool of channels. The times at which the freeze signal is transmitted is not critical to the present invention and may be periodic or nonperiodic. For example, an operator at the reference station may initiate a freeze signal whenever the traffic pattern of calls between the various stations indicates that a reallocation of channel assignments would be beneficial. If transmitted periodically the period could be set at a fixed time, e.g., 3 hours, within which it is expected that the traffic pattern of calls will have changed sufficiently to warrant a reallocation of channels. The freeze signal, transmitted only by the reference station, and the present channel requirement number (PCR) may be transmitted in the preamble of the burst of the respective station.

Each station receives the PCR numbers from all other stations and also from itself via the satellite and stores these numbers. The following calculations are then carried out at each station:

$$C_R = \sum_{i=1}^{n} PCR_i, \text{ where}$$

$C_R$ is the minimum channel requirement for the entire network, $PCR_i$ is the PCR number from the $i$th station, and $n$ is the number of ground stations in the network.

Since the total system channel capacity C is known, the total system slack capacity $C_S$ can be computed by, $$C_S = C - C_R.$$

For the case in which the total number of surplus channels, $C_S$, are to be allocated equally among the $n$ stations, the number of surplus channels per station, P, is computed as follows, $$P = \text{integral value of } C_s/n.$$

The total number of channels, A, to be allocated to each station, is given by, $$A_i = PCR_i + P.$$

The values A are stored along with the values representing the current channel allocation for the stations. The latter values are hereinafter designated by the letter B. A differential channel allocation, Δ is then obtained for each ground station as follows, $$\Delta_i = A_i - B_i.$$

The Δ values indicate the amount of change in the number of channels to be allocated to a given station and the sign of the Δ value indicates the direction of the change.

Figures 4, 5:
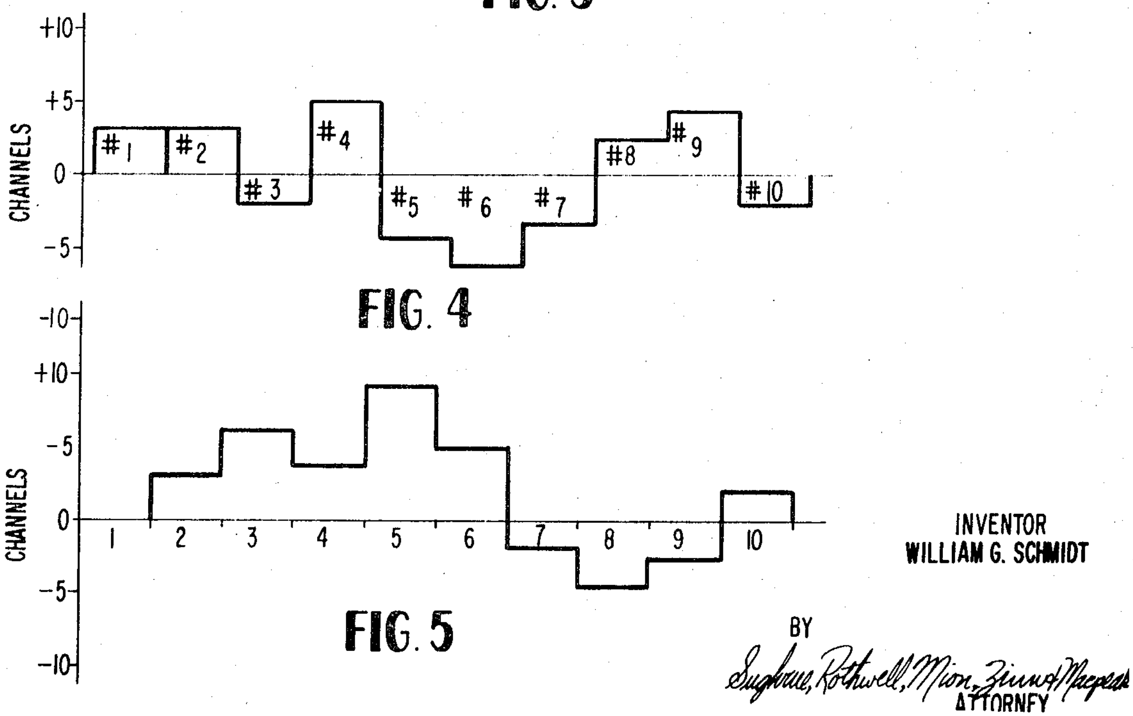
FIG. 4 is a graph of channel difference numbers helpful in understanding the present invention.
FIG. 5 is a graph representing the direction and amount of shifting for all the station bursts. It is helpful in understanding the present invention.

FIG. 4 represents a graph of the Δ values for a 10-station system. The values are assumed only for the purpose of illustrating the present invention. The numbers in the blocks along the abscissa represent the station numbers and the height of the graph represents the Δ number. The Δ values as shown in FIG. 4 for stations 1 through 10 are, respectively, +3, +3, −2, +5, −4, −6, −3, +2, +4 and −2. The positive numbers represent the increase in channels to be allocated to the particular station and the negative numbers represent the decrease in channels to be allocated to the particular station.

At this stage of the process, the total number of channels to be allocated to each station in the reallocation process is known, and also the Δ values for each station are known. The value $\Delta_i$ only tells us that the total burst time of station $i$ is to be changed by the amount $\Delta_i$. However, it tells us nothing about the variation of the start time of the burst for station $i$. Certainly, if the burst times for the stations which precede station $i$ are to be varied then the start time of the burst for station $i$ must be shifted either forward in time or backward in time with respect to the frame reference. All station bursts, except for the burst from the reference station, are delayed in time with respect to the frame reference. Thus, shifting a burst forward in time means decreasing this delay and shifting a burst backward in time means increasing this delay. It is apparent then that the shift in the start time of the station burst for station $i$ depends upon the variation in the length of all bursts which precede station $i$, that is, stations 1 through $(i-1)$.

The burst initiate time change, σ is calculated as follows, $$\delta_i = \sum_{m=1}^{(i-1)} \Delta_m \cdot$$

The above equation means that to obtain each $\sigma_i$, all Δ values for the stations 1 to $i-1$ are algebraically added to obtain the total channel variation prior to the station $i$ burst. If $\sigma_i$ is positive, that means that the station $i$ burst must be further delayed with respect to the frame reference by an amount $|\sigma_i|$ to make room for the expansion of the burst times preceding it. If $\sigma_i$ is negative, that means that station $i$ burst must be transmitted sooner with respect to the frame reference by an amount equal to the absolute value $|\sigma_i|$ to make up the slack of the contracting prior bursts. For the Δ values illustrated in FIG. 4 and given above, the σ values are illustrated in FIG. 5, wherein the numbers along the abscissa represent the stations in the network. Since the start time of the burst from station number 1 is the frame reference, it is not shifted in time and the value $\sigma_1$ is equal to zero. This, of course complies with the above equation since there are no Δ values prior to $\Delta_1$. From FIG. 4 we see that the Δ value for station 1 is equal to +3, which means that the burst time for station number 1 will be increased by three channel times. Consequently, although the start time of the burst from station 1 does not vary, the lagging edge of the burst time is increased by three channels and the start time of burst number 2 must be shifted back in time by the same amount so that it will not coincide with the tail end of station 1 burst. According to our equation, the value $\sigma_2$ is equal to +3 and this is plotted in FIG 5. The σ values for all of the stations are calculated in the same way.

Analyzing FIG. 5 we see that each positive σ (plotted above the abscissa axis) indicates a required backward shift in time, whereas each negative σ (plotted below the abscissa) indicates that the burst start time must be shifted forward with respect to the frame reference.

At this stage the amount and direction of shift of the burst times for every station is known. Since burst synchronizers of the type described in the Gabbard application mentioned above, are adapted to shift the burst times for the individual station in accordance with signals representing the amount of shift, the proper shift could be carried out at any station by applying the signal σ to the burst synchronization apparatus. However, since with the apparatus there described burst shifting is not accomplished instantaneously but may require several frames to completely move the burst from its old position to its new position, the possibility is great that bursts from adjacent stations may overlap during the shifting process if they are all shifted at the same time. For example, looking at FIG. 5 it is seen that the burst from station 5 must move backward in time and also the burst from station 6 must move backward in time. If bursts from both stations 5 and 6 are moved at the same time, the possibility exists that the bursts may overlap during the shifting time and channel interference may result. However, bursts transmitted by stations 6 and 7 can be shifted during the same period because for proper reallocation as indicated by the σ values, the station 6 burst moves back in time and station 7 burst must move forward to meet the lagging edge of station 6 burst. Since the two station bursts must shift towards one another to close the gap therebetween, there is no chance that the bursts from station 6 and 7 will overlap if shifted at the same time. The overall shifting algorithm, which is performed by each station sharing in the pool of channels, is described as follows:

1. Those stations which have positive σ values in FIG. 5 are to shift their bursts toward the rear of the frame, starting with the highest numbered station within the particular positively valued area. Hence, in the example, stations 6 and 10, at the receipt of the first reallocation marker from the reference station, will adjust their burst times for a five- and two-channel period delay, respectively. At receipt of the second reallocation marker, station 5 adjusts its burst for a nine-channel delay, etc.

2. Those stations which have negative σ values in FIG. 5 are to shift their bursts forward toward the front of the frame, starting with the lowest numbered station within the particular negatively valued region. Hence, in the example, the first channel reallocation marker should activate station 7 to move its burst forward by one channel period. The second reallocation marker activates station 8 to move its burst forward by four channel periods, etc. After a station burst is moved by the above process the station $\sigma$ value becomes zero.

3. Those stations with zero $\sigma$ values would not respond to channel reallocation markers. Note that station 6, 7 and 10 may respond, simultaneously, to the first marker, stations 5 and 8 react to the second marker, etc.

The above-described shifting algorithm can be expressed as follows: Upon receipt of a channel reallocation marker the burst for station $i$ is shifted if (1) $\sigma_i$ is positive and $\sigma_{i+1}$ is zero or negative, or if (2$\sigma_i$ is negative and $\sigma_{i-1}$ is positive. After a station burst is shifted the $\sigma$ value drops to zero.

Figure 6:
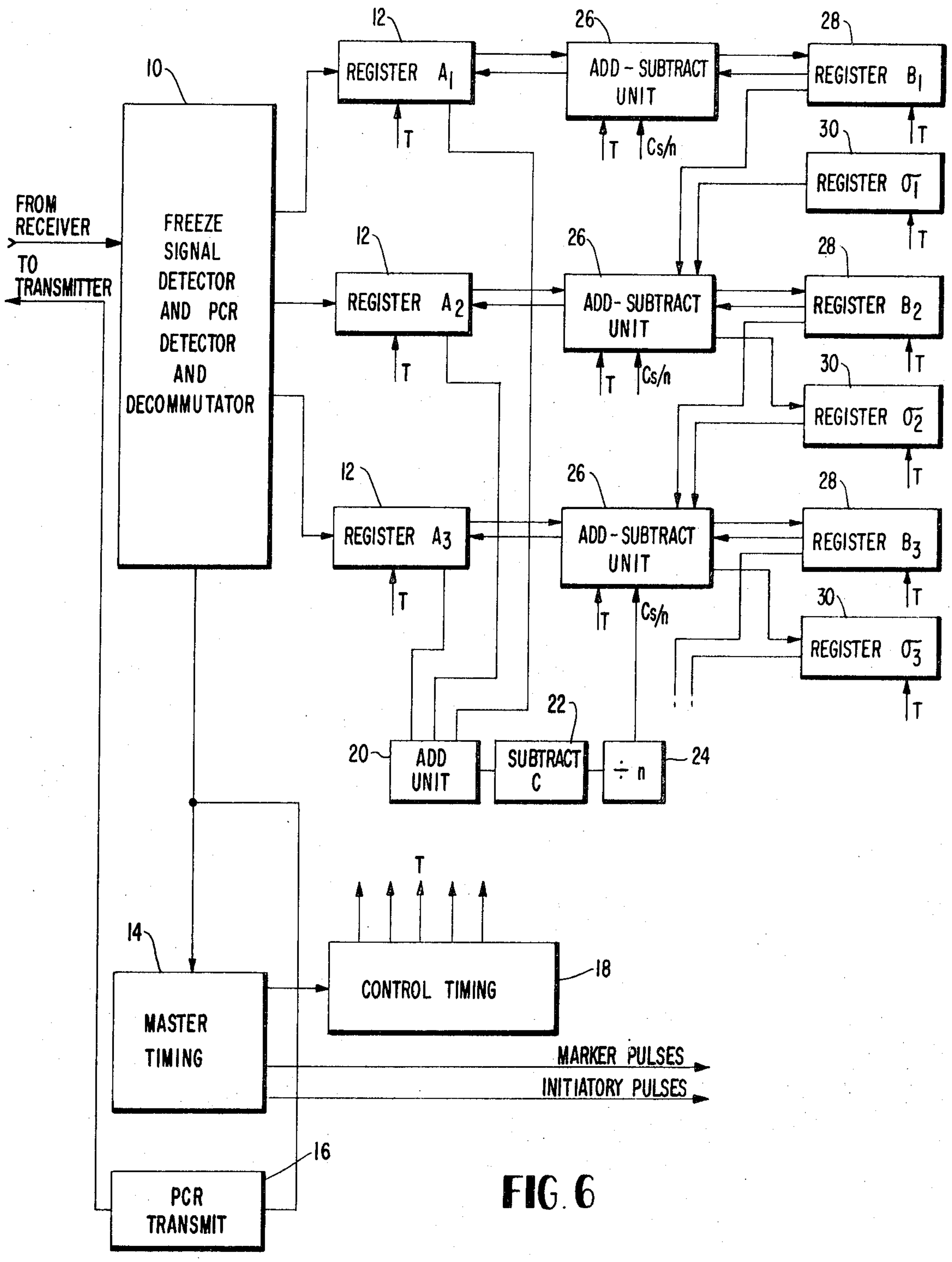
FIG. 6 is a block diagram of one example of apparatus useful in performing the method of the present invention.
Figure 12:
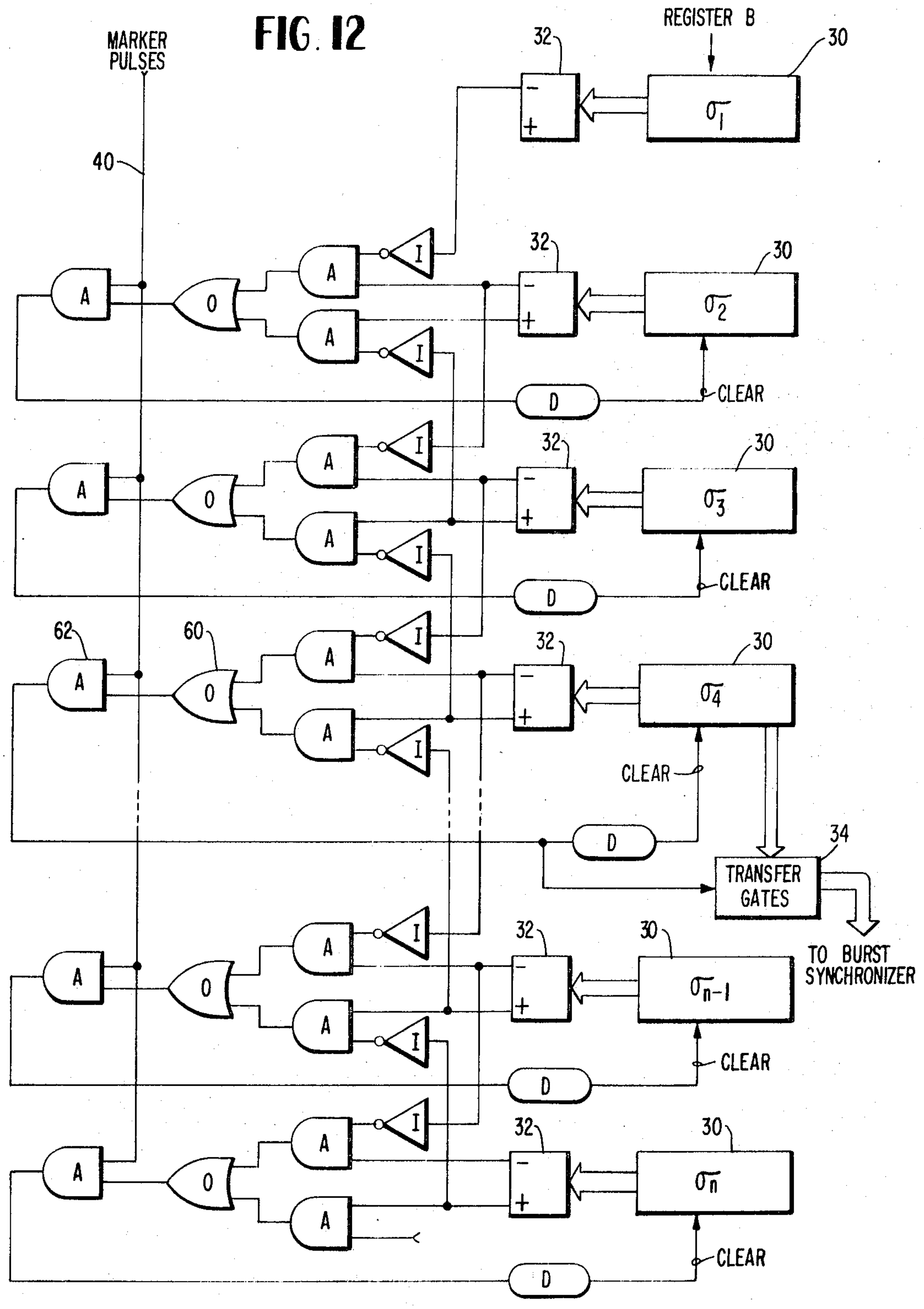
FIG. 12 is a block diagram of one example of apparatus useful in performing the method of the present invention.

This completes the description of applicant's unique method for reallocating channels among several ground stations in a TDMA communications network on a demand basis. Given the above-described unique method, apparatus for accomplishing the method could be designed by anyone of ordinary skill in the art of TDMA communications systems or in the art of logic design. One example of apparatus for carrying out applicant's novel method will be discussed in connection with FIGS. 6 and 12. The combined apparatus of FIGS. 6 and 12 is assumed to be placed at each of the ground stations within the network, although it is not necessary that the apparatus be placed at the reference station since the burst time at the reference station does not change. However, if it is desired to operate a system in which the duties of the reference station are periodically switched among the several stations in the system, then all stations would have the apparatus shown in FIGS. 6 and 12.

The periodic reallocation initiate signals or "freeze" signals sent out by a reference station are detected via the detector and decommutator 10 of FIG. 6. The detector and decommutator 10 starts the process in operation by triggering a master timing circuit 14 and a PCR transmit circuit 16. The master timing circuit 14 controls the timing of events during the process and may comprise a clock pulse generator which provides output pulses at the proper times to initiate the steps of the process. The PCR transmit unit 16, upon being initiated, transmits the PCR information during the preamble of the station burst. The information transmitted by the PCR unit represents the present channel requirement of the ground station and may be stored in the unit 16 or may be obtained from some other logic at the ground station. In the simplest form, the operator could key the PCR number into the unit 16. The PCR information from all stations are transponded through the satellite and down to all stations where they are applied to the decommutator 10 which separates the information on a station-by-station basis. The output PCR information from the detector and decommutator 10 are applied sequentially to each one of a group of registers 12, a separate register being present for each station in the system. As stated above, the PCR information transmitted to the satellite will be in the burst preambles and therefore will be time division multiplexed. In such a case, the decommutator 10 could operate to demultiplex or decommutate the PCR information on a timed basis in a manner well known in the art. The result is that register $A_1$ now contains the information $PCR_1$, register $A_2$ contains the information $PCR_2$, register $A_3$ contains the information $PCR_3$, etc.

It should be noted at this time, that the master timing circuit 14 provides its output pulses to a controlled timing circuit 18 which has a plurality of output terminals all labeled for convenience, T. The input pulses to timing circuit 18 cause the output terminals to be energized at certain times controlled by the timing circuit 18. Control timing circuits of this type are well known in the art and the only purpose of showing such a circuit herein is to indicate that the sequence of operation of the method can be accomplished by energizing the registers and arithmetic units of the system at desired times under control of a control timing circuit. The connection between the output terminals of the controlled timing circuit and the remaining apparatus of the drawing is illustrated by the lead line labeled T which are applied to the other apparatus as shown.

The PCR values in the registers 12 are summed in an addition unit 20 thereby providing the value $C_R$, which is the total number of channels presently required by the system. This is subtracted from the total number of channels in the system, C, in a subtract unit 22, the output of which is divided by the total number of stations $n$ in the network, to provide an integer output, P, which represents the number of slack channels to be allocated to each one of the stations. In the specific example described herein it is assumed that the remainder channels are not assigned and left unused. The output from the divide by $n$ unit 24 is applied to a plurality of add-subtract units 26. Although only three add-subtract units 26 are shown in the drawing, it should be understood that there are as many add-subtract units 26 per station as there are stations in the network. The PCR data in the register 12 are also applied as one input to the add-subtract units 26. The add-subtract units perform the summation, $A_i=PCR_i+P$ and the A values, representing the total number of channels to be allocated to the stations by the reallocation process, are inserted back into the respective registers 12.

A group of registers 28, contain the B values which represent, for each station, the number of presently allocated channels. The B values are subtracted from the A values in the add-subtract units 26 thereby forming the $\Delta$ values which are inserted into the registers 28 to replace the B values. At this time, the registers 28 contain data such as that represented by the graph shown in FIG. 4.

The $\sigma$ values can be obtained sequentially by adding in sequence the $\Delta$ values stored in the registers 28. As illustrated in FIG. 6, the apparatus includes a plurality of registers 30, one for each station, for storing the $\sigma$ values. A $\sigma_1$ register is illustrated in the drawing but since the value of $\sigma_1$ is always zero that register is not necessary. The value $\Delta_1$ is added to the contents of the $\sigma_1$ register 30 (which is zero) to obtain the value $\sigma_2$ which is inserted in the $\sigma_2$ register. $\Delta_2$ from a register 28 is added to $\sigma_2$ from the proper register 30 to form the value $\sigma_3$ which is inserted into the $\sigma_3$ register 30, etc.

Instead of having a plurality of add-subtract units 26 as indicated in FIG. 6, it will be apparent to anyone of ordinary skill in the art that a single arithmetic unit could be used for performing all of the mathematical computations necessary to obtain the desired values. Furthermore, as is typical in the case of most electronic mathematical operations, the algebraic signs of all results are represented by the binary value of the electrical voltage or current in one of the bit positions. This applies to digital computations which is assumed for the example shown in FIG. 6. In this instance, each of the $\sigma$ registers 30 contain a number representing the proper $\sigma$ number and also a sign bit. The sign bits are used to control the order in which the bursts are shifted.

The master timing circuit 14 also provides a plurality of reallocation marker pulses, used to initiate burst shifting, and an initiatory pulse. The marker pulses may be generated by the master timing circuit in a conventional manner in response to the input pulse from the decommutator 10. The time separation between the marker pulses is set to allow complete shifting of the burst time for the station which requires the maximum amount of shifting. The initiatory pulse is provided at a time which is safely behind the time at which reallocation will have been completed. The initiatory pulses are used to shift the A values from registers 12 into registers 28 for use in the next succeeding reallocation cycle.

Referring now to FIG. 12, the registers 30 which store the $\sigma$ values are illustrated again. The sign bits in the $\sigma$ registers are applied respectively to a plurality of binary circuits 32. Each of the binary circuits 32 has a pair of outputs which are in the opposite logical sense at all times. Using the convention of "UP" and "DOWN" to refer to opposite-type logic signals, when the sign of the value $\sigma$ is positive, the lower output from the adjacent binary circuit 32 is UP and the upper output is DOWN. The reverse is true when the sign of the $\sigma$ value stored in the register is negative. Of the remaining units illustrated in FIG. 12, those with an I therein are invert gates, those with an A are AND gates, those with an O are OR gates, those with a D therein are time delay circuits, and the unit 34 represents a bank of AND gates for transferring the value $\sigma_4$ to the burst synchronization apparatus. The system shown in FIG. 12 is assumed to be located at the ground station number four, and that is why provision is made for transferring $\sigma_4$ to the burst synchronization apparatus. Note that if the value of $\sigma$ is zero then both outputs from the associated binary circuit 32 are DOWN.

The logic shown in FIG. 12 operates to carry out the shifting algorithm described above. A single example will illustrate how this is accomplished. If $\sigma_4$ is positive, meaning a move backward in time for the station burst from station four, the lower output of associated binary circuit 32 will be up and the upper output will be down. If $\sigma_5$ is negative or has a value of zero, the OR-gate 60 associated with the $\sigma_4$ register will be enabled. Consequently, when a reallocation marker pulse arrives via lead line 40, the AND-gate 62 will provide an output which energizes transfer gates 34. The value $\sigma_4$ will be shifted through the transfer gates 34 to the burst synchronization apparatus for shifting the burst by an amount proportional to the value $\sigma_4$. After a short delay, the register containing the value $\sigma_4$ will be cleared thereby effectively erasing the value $\sigma_4$.

If, on the other hand, the value of $\sigma_4$ is negative, the sign of the value $\sigma_3$ is controlling as to whether or not the OR-gate 60 associated with $\sigma_4$ will be energized. It will be noted that for all other registers, when their associated OR gates are energized, the reallocation marker pulses operate only to clear or erase the registers thereby presenting a value of zero for that particular register when the next reallocation marker pulse arrives.

Figure 7:
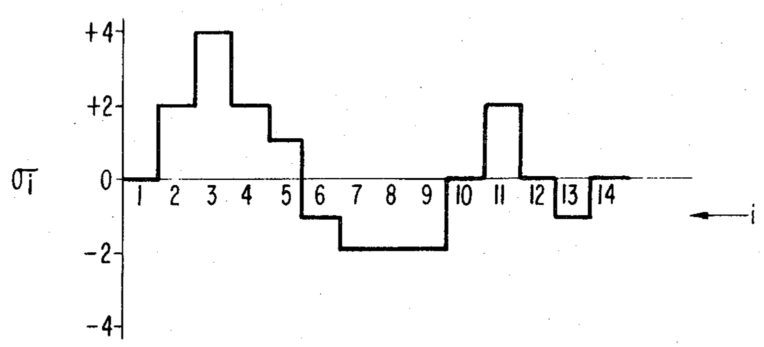
FIGS. 7 through 11 are graphs representing the order of movement of the transmission bursts from the various stations.

The graphical plots of FIGS. 7 through 11 illustrate the values of $\sigma$ held in the registers 30 at different times during the process. Each figure represents the $\sigma$ values following a successive reallocation marker pulse. In FIG. 7 the initial contents of the registers 30 are illustrated. There are two positive groupings, i.e., stations 2 through 5 and station 11, stations 5 and 11 being the highest numbered station of each grouping, respectively. These stations will react to the first reallocation marker pulse by transferring to their respective burst synchronization circuitry the information to increase their delay with respect to the frame reference by amount equal to the values $\sigma_5$ and $\sigma_{11}$, respectively.

Figure 8:
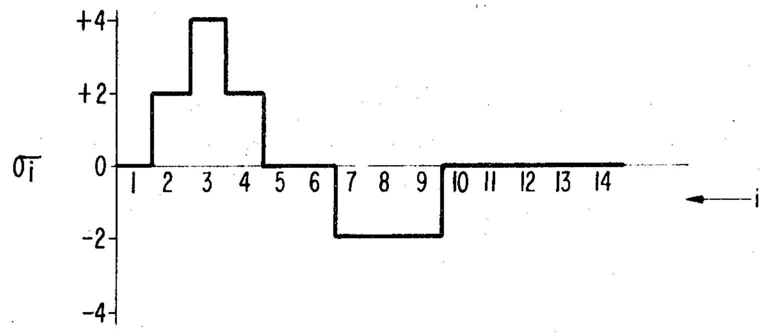
Figure 9:
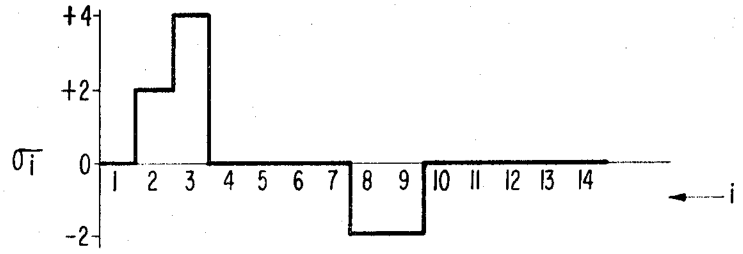
Figure 10:
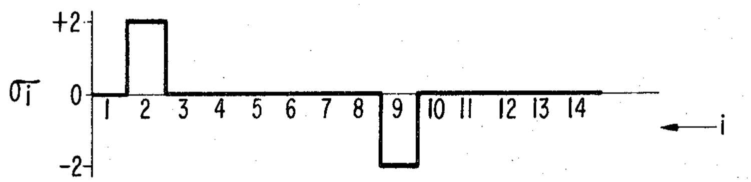
Figure 11:
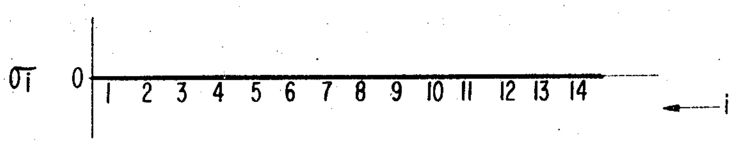

There are two negatively valued groups; stations 6 to 9 and station 13. The algorithm indicates that stations 6 and 13 react to the first marker but will shift their bursts forward. For those stations which are reacting actively to a marker, the marker is used to transfer the $\sigma$ information out of the register 30 into the burst synchronization circuitry. All of the registers representing the stations which move in response to the first reallocation marker pulse are cleared thereby representing the values of $\sigma=0$. Thus, just before the second marker is received, the contents of registers 30 are as illustrated in FIG. 8. When the second marker is received, station 4 starts to move backward while station 7 starts to shift its burst forward. FIGS. 9, 10 and 11 show the contents of the registers 30 before the third, fourth and fifth reallocation marker pulses, respectively.

A method, and apparatus for performing that method have been described which enables dynamic and automatic redistribution of a TDMA network capacity in the face of a varying traffic loading for each station in the network. Such a dynamic capacity sharing optimization as based upon demand assignment techniques, will enable a TDMA network to operate far more efficiently than the conventional preassigned modes of channeling capacity allocation. The individual operations necessary to calculate the $\sigma$ values are the straightforward arithmetic operations of addition, subtraction and division. These operations are illustrated generally by the blocks in FIG. 6 which are labeled addition-subtract, divide, add, and subtract, and it is well within the skill of the art to carry out these operations once the method of the invention, described herein, is known.

What is claimed is:

1. The method of reallocating channels to multiple stations in a communications system comprising the steps of, a. establishing a value A for each station, where $A_m$ is the number of channels to be allocated to station $m$, b. generating a value $\sigma_i$ for each station $i$ where $$\delta_i=\sum_{m=1}^{(i-1)}(A_m-B_m)$$

and $B_m$ is the number of channels currently allocated to station $m$, whereby $|\sigma_i|$ represents the time change of the station $i$ burst necessary to accomplish channel reallocation and the algebraic sign of $\sigma_i$ represents the direction of said time change, c. adjusting the start time of the transmission burst of station $i$ by an amount of time proportional to $|\sigma_i|$ and in a direction dependent upon the sign of $\sigma_i$, and d. wherein $m$ and $i$ are merely subscripts which are related to one another in a manner given in the above equation and are used herein as variables representing stations in the communications system.

2. The method as claimed in claim 1 wherein the step of adjusting the start time of the transmission burst of station $i$ comprises a. storing at least the algebraic signs of $\sigma$ for each station, b. periodically sampling said stored algebraic signs, c. erasing the stored sign for $\sigma_k$ where $k$ designates any station at the sampling period when the sign of $\sigma_k$ represents forward movement in time and the sign of $\sigma_{k-1}$ represents backward or no movement in time, d. erasing the stored sign for $\sigma_k$ at the sampling period when the sign of $\sigma_k$ represents backward movement in time and the sign of $\sigma_{k+1}$ represents forward or no movement in time, and e. transferring the value $\sigma_i$ to a burst syncronization control apparatus at station $i$ at the sampling period when either of the conditions of steps (c) and (d) are satisfied for $k=i$.

3. The method as claimed in claim 2 wherein the step of generating comprises a. storing respective values B, representing respective current channel allocation, for each station, b. subtracting respective values B from respective values A for each station to obtain respective difference values $\Delta$, for each station c. algebraically adding, for each station, the difference values $\Delta$ obtained in step (b) for all stations which preceed said each station in the order of stations, the order of stations being the order of occurrence of the station bursts with respect to a reference station burst.

4. The method as claimed in claim 3 wherein the step of establishing a value A for each station comprises a. receiving from each station a respective request number RQT, representing that station's present channel usage b. summing all request numbers and subtracting the sum from the total number of channels in the system to obtain a number representing remaining channels to be allocated c. adding a number of channels P to each RQT to form the numbers A, wherein P is not necessarily the same for each RQT to which it is added, and the sum of all P's is equal to or less than the number representing the remaining channels.

5. The method as claimed in claim 3 wherein the step of establishing a value A for each station comprises a. receiving from each station a request number RQT, representing that station's present channel usage b. summing all request numbers and subtracting the sum from the total number of channels in the system to obtain a number representing remaining channels to be allocated, c. dividing the number of remaining channels by the total number of stations in the system and adding the integral dividend to each of said request numbers.